United States Patent
Kuijlaars

(10) Patent No.: US 7,812,738 B2
(45) Date of Patent: Oct. 12, 2010

(54) DEVICE WITH SIGNAL GENERATOR AND SIGNAL RECEIVER FOR PROVIDING CONTROLLED ACCESS TO INFORMATION AND/OR COMMUNICATION CHANNELS

(76) Inventor: Erik Gerardus Adriaan Kuijlaars, Parkweg 19, Voorburg (NL) 2271 AD ( * ) Notice: Subject to any disclaimer, the term of this patent is extended or adjusted under 35 U.S.C. 154(b) by 0 days.

(21) Appl. No.: 11/758,968

(22) Filed: Jun. 6, 2007

(65) Prior Publication Data

US 2007/0290877 A1 Dec. 20, 2007

Related U.S. Application Data

(60) Provisional application No. 60/804,028, filed on Jun. 6, 2006.

(51) Int. Cl.
G05B 19/02 (2006.01)
G08B 5/22 (2006.01)
G08C 19/00 (2006.01)

(52) U.S. Cl. .............. 340/825.22; 340/825.69; 340/825.72; 340/825.24; 340/825.29; 725/30; 725/60; 725/78; 725/52; 715/716

(58) Field of Classification Search ............ 340/825.22, 340/825.69, 825.72, 825.24, 825.29; 725/30, 725/60, 78, 52; 715/716, 864; 348/5.5, 10, 348/906; 368/107, 184
See application file for complete search history.

(56) References Cited

U.S. PATENT DOCUMENTS

| | | | | |
|---|---|---|---|---|
| 4,700,296 A | * | 10/1987 | Palmer et al. ............. | 705/32 |
| 5,465,113 A | * | 11/1995 | Gilboy .................... | 725/29 |
| 5,521,631 A | * | 5/1996 | Budow et al. ............. | 725/78 |
| 5,661,517 A | * | 8/1997 | Budow et al. ............. | 725/60 |
| 5,726,645 A | * | 3/1998 | Kamon et al. ........... | 340/825.22 |
| 6,275,991 B1 | * | 8/2001 | Erlin .................... | 725/141 |
| 6,336,729 B1 | * | 1/2002 | Pavelle et al. ........... | 362/34 |
| 6,424,947 B1 | * | 7/2002 | Tsuria et al. ............ | 705/1 |
| 6,476,825 B1 | * | 11/2002 | Croy et al. .............. | 715/716 |
| 6,781,923 B1 | * | 8/2004 | Lizzi .................... | 368/107 |
| 6,831,570 B2 | * | 12/2004 | Barile et al. ........... | 340/825.69 |

* cited by examiner

*Primary Examiner*—Brian A Zimmerman
*Assistant Examiner*—Nam V Nguyen
(74) *Attorney, Agent, or Firm*—Ostrolenk Faber LLP; Steven M. Hoffberg

(57) ABSTRACT

A system and method for communicating between a signal generator and a signal receiver, for providing controlled access to information and/or communication channels, whereby the signal generator and the signal receiver are set to wirelessly transmit and receive a plurality of simultaneously transmitted signals, respectively, and the signal receiver is set to selectively provide access to information and/or communication channels on receiving the plurality of simultaneously transmitted signals from the signal generator, the signal generator comprising means for limiting a transmission of a predetermined signal to at least one of a prescribed duration and a prescribed number of activations for access to the information and/or communication channels.

21 Claims, 1 Drawing Sheet

DEVICE WITH SIGNAL GENERATOR AND SIGNAL RECEIVER FOR PROVIDING CONTROLLED ACCESS TO INFORMATION AND/OR COMMUNICATION CHANNELS

FIELD OF THE INVENTION

The present invention relates to the field of remote controls for electronic devices.

BACKGROUND OF THE INVENTION

Remote control systems, including devices with a signal generator and a signal receiver for providing controlled access to information and/or communication channels, whereby signal generator and signal receiver are set to transmit and receive an infra-red signal or radio signal, respectively, and the signal receiver is set to provide access to the information and/or communication channels on receiving the signal, are known. Suitable information and/or communication channels include the entire range of radio, television, film channels and video channels, plus all possible data channels. Remote controls are also known for toys, computers, consumer electronics, automobiles, etc.

Such a device is in itself known and is widely used in combination with providing paid access to television channels or film channels in hotel rooms, for example. By using an appropriate computer system, it is possible to monitor how long and which television and/or film channels are watched and whether an Internet connection is used, for example. Besides the fact that such systems are particularly expensive, the disadvantage of such a system for the hotel guest is that his/her privacy can easily be invaded. In particular, the log of hotel guest activities may be an invasion of privacy, and the distribution of that log as part of a bill problematic.

Another known, simpler system allows the hotel guest to rent an operating unit when he/she registers at the hotel reception desk, and provides the hotel guest access to the available information and communication channels during his/her stay. Such a system has the disadvantage that careful administration has to be kept of who has been provided with such an operating unit, whether the operating unit has been returned and whether it has actually been paid for. The transport of the unit also opens it to possible theft or damage.

Micropayment technologies are known which allow, using cryptographic security, a reasonably secure payment to be made without requiring real-time verification. Some of these technologies also allow re-spending of received value. See, e.g., U.S. Pat. No. 5,999,919 expressly incorporated herein by reference. See also Rivest and Shamir, "PayWord and Micro-Mint: Two Simple Micropayment Schemes" (May 7, 1996), all of which are expressly incorporated herein by reference.

Rolling code technologies provide a method for cryptographically communicating using a cryptographic scheme which changes with use or time. The encryption key seed and decryption key seed each advance incrementally and are kept in synchronization. Thus defeats replay attacks, since old messages no longer have the proper cryptographic properties. See, e.g., U.S. Pat. Nos. 7,050,947; 6,980,655; 6,900,720; 6,882,729; 6,810,123; 6,690,796; 6,323,566; 6,249,582; 6,225,889; 6,194,991; 6,154,544; 6,078,271; 6,046,680; 6,028,527, each of which is expressly incorporated herein by reference.

Challenge Response technologies require a two-way communication between two systems which seek to communicate. Typically, one system seeks to authenticate the other, but the technology is also capable of authenticating both systems to each other. DTCP (content protection for IEEE-1394) employ such technologies. See, e.g., U.S. Pat. Nos. 7,051,212; 7,025,209; 7,010,692; 6,981,145; 6,850,252; 6,792,533; 6,640,304; 6,607,136; 6,427,140, expressly incorporated herein by reference.

SUMMARY OF THE INVENTION

The present invention is intended to provide a system with which the above disadvantages of these known systems can be overcome. Correspondingly, according to the invention, the wireless signal generator will be set to transmit an encoded signal which limits a number of times a service may be operated and/or a time period over which such services may be operated.

For example, a hotel guest may wish to purchase a pay per view movie for single viewing, without that transaction appearing on the hotel bill. The guest acquires an encoded device which carries with it the right to activating the pay per view service, but cannot be used more that the predetermined limit. The device can preferably be transferred, and thus the acquisition of that device may be anonymous. Likewise, the use of that device may be self-authenticating, and therefore detailed logs need not be maintained or analyzed for real-time billing purposes. Typically, a log is maintained for royalty auditing, but the audit log may be anonymous or even aggregated data.

According to an embodiment of the present invention, the signal generator will be set to transmit a predetermined signal comprising simultaneous transmission of two or more different codes once only or for a previously-determined time, to a programmed signal receiver, e.g., in a hotel television, which is able to accept these codes simultaneously and provides direct access to the available information and communication channels. For example, the Philips iTV platform is capable of receiving multiple signals simultaneously. The use of the simultaneously transmitted signals discourages the use of signal recording devices to replay the signal, and thus permit unauthorized use of the programmed signal receiver. Of course, this technique can only be used in conjunction with signal receivers which simultaneously receive the signals for processing.

One embodiment of the invention therefore provides a signal generator embodied as a disposable product in the form of a small remote control with volume (up and down) and channel (up and down) buttons, that can only be used once or for a limited period. This has the advantage that no administration at all has to be kept, and that there is absolutely no invasion of the hotel guest's privacy. The fact that the signal generator according to this embodiment of the present invention transmits a predetermined signal of two or more different codes once, to a programmed signal receiver in the hotel television, makes it difficult or impossible to access the available information and communication channels otherwise.

In order to permit the signal generator be suited for limited usage, the time during which the previously-determined signal is capable of being transmitted may be limited to a short period required to control the signal receiver within the scope of intended or authorized usage. For example, a single usage activation device may be provided. Here, account must be taken of the fact that the signal generator must be properly set and that the hotel guest is not acquainted with its specific equipment and set-up. The time the device is operational will therefore be in the order of several seconds to several minutes and more preferably in the order of 10 to 60 seconds. In practical tests, an operational time of 25 to 35 seconds appeared to be amply sufficient.

According to one embodiment, the signal generator is provided with a signal source for generating two or more codes simultaneously, a power source and a contact switch for the connection of the power source, whereby the capacity of the power source is such that the predetermined signal can be transmitted for the predetermined time. With this embodiment, the time is determined by the capacity of the power source and the power consumption of the signal generator and remainder of the device. If the signal generator has a variable power consumption, it is also possible to provide a constant load across the power source after activation, which will drain the power source after a predetermined period of time.

Although the available usage time can be reasonably determined with such a circuit, it is possible that a signal generator that has been in stock for a long time will have a reduced power source capacity such that the available operating time is insufficient. It is therefore preferable to have an embodiment whereby the signal generator is provided with a power source, a contact switch and a programmable integrated circuit, whereby the predetermined signal to be transmitted and the time that the signal is to be transmitted are programmed. Here, there is a provision that the program included in the programmable integrated circuit is triggered by the first closing of the switch.

With such an embodiment, the time that the signal is transmitted can be determined quite precisely in the software, and the time does not generally depend on a power source capacity (which may have a surplus) that is not exactly known.

In order to ensure that the signal generator can no longer be used after the programmed time has expired, another embodiment provides a means for interrupting the signal, by using the program. Instead of interrupting the signal, the program can be so set that the signal of two or more codes transmitted is changed and is not recognized by the signal receiver. In both cases, reuse of the signal generator for its original purpose is in fact no longer possible. This can be improved on by providing that running through the program ends with the total deletion of the relevant program data, that is, the program data is stored in volatile memory which is modified during execution. Thus, another type of security may be provided, or triggering of a fuse to permanently inactivate the device or make functions inaccessible. For example, premium channels may be limited to a set duration, while other functions, such as volume, and non-premium channels, may be accessible without restriction. Indeed, this embodiment permits a pre-purchase of pay per view content, activated by a pressing a button on the device, and which after a predetermined number of presses, becomes exhausted.

An embodiment of the invention may therefore provide the signal generator with a power source (such as an electrochemical battery, zinc-air battery, capacitor, or fuel cell), a contact switch and a programmable integrated circuit, whereby the previously-determined signal to be transmitted and the time that the signal is to be transmitted are programmed. Here, there is a provision that the program included in the programmable integrated circuit is triggered by the first initiation of contact of the switch. This embodiment is generally consistent with a relatively simple device which transmits a static identification code which directly authorizes the receiver, rather than an embodiment wherein the management system receives a signal from the device, through the receiver, and then authorizes usage.

Furthermore, the device can preferably be provided with a contact that can be set from an unconnected state to a connected state once only for the connection of the circuit to the power source. As a result, the power source can be kept at sufficient capacity as long as possible and undesired signal generator operation can be prevented. As an alternate to the contact, advantageously a zinc-air battery is employed, which is activated by exposing the cell to air by removing a barrier. Once this electrochemical reaction starts, it will typically exhaust the battery over a relatively short period.

Besides the device with signal generator and signal receiver, the present invention also relates specifically to the signal generator itself, whereby the signal generator comprises a housing that accommodates a programmable integrated circuit, a power source, a control to transmit the programmed signal (e.g., comprising a plurality of simultaneously transmitted components) and a switch to start the program that is saved in the integrated circuit. Here, the signal generator is preferably further provided with a removable interrupter in the connection of the power source to the integrated circuit.

It should be clear that the signal generator according to an embodiment of the invention can be offered in many different ways because it is a disposable (throw-away) product for once-only use that cannot inherently be administratively connected to the user in any way. This is an important aspect of this embodiment of the invention, and its use as such with offering the signal generator is therefore part of the invention.

The invention also provides a method for marketing the signal generator that is mainly characterised by offering the signal generator through free sales channels, e.g., at no immediate cost to the user. According to another embodiment, the signal generator is offered for sale through a vending machine. Here, one can think of a vending machine for sweets and soft drinks, with one segment of the vending machine being reserved for an array of signal generators, for example. In this way, the signal generator is offered for sale completely anonymously and the consumer can buy a signal generator at any desired moment.

Besides this, the signal generator can also be offered for sale at a hotel desk or in a minibar in a hotel room. In this way, it is known that a hotel guest has bought a signal generator; however, his/her privacy is still generally preserved with regard to his/her viewing and listening behaviour.

The method according to the invention further provides the possibility of offering the signal generator as a promotional product. Here, we can think of travel agencies or other companies in service industries allied to the hotel, such as car hire companies and restaurants.

Finally, the method according to the invention also provides the possibility that the signal generator can carry one or more advertising slogans. Besides being able to put logos and brand names on the signal generator, it is equally possible to make the external appearance of the signal generator such that it (largely) corresponds with the product or logo design of the company making the advertisement.

According to another embodiment, the device presents a self-authenticating signal, which changes dynamically, and is not subject to replay attacks, since devices can be created to capture infrared or RF signals and reproduce these identically. Thus, once a signal sequence is employed, that particular sequence must be deauthorized for future use. In the case of a limited time signal, two particular options are preferred. First, a rolling code algorithm may be employed, in which each use of the device resets the code (and the corresponding authentication of the next transmitted code). Such rolling codes are well known in the art. A rolling code system may thus be implemented which provides secure authentication and communication of a message, and which is immune to replay attacks. This requires synchronization between the transmitter and receiver, which may be achieved by providing, for example, a photodiode (or may employ the normally transmissive LED as a photodiode) in the device which receives an optical signal from a television screen.

According to another embodiment, a micropayment system is implemented in which "credits" stored in the device are transferred to the device to be controlled through a cryptographically secure means. Thus, the transmitter device includes prepaid credits which are then spent during the course of communications with the device to be controlled, e.g., a set top box or television. A micropayment is transferable, and relatively anonymous, since the value is verified principally through cryptographic means. Means may also provided to ensure that the same credit is not transferred twice from the same (or counterfeit) source.

While many aspects of the present invention obviate the need for a real-time accounting and management system, in some cases this may be employed. Typically, the accounting and management systems communicate in a real-time with a facility management system, such as is provided by On Command Corporation, Denver Colo. Thus, a predetermined and/or cryptographically defined code may be communicated from the device, received by a set top box or other receiver, and communicated to a management system for authentication. Since, in a preferred embodiment, the device is permitted prepaid usage, and is anonymous, the management system authenticates that the device transmits an appropriate code, and either itself contains usage restrictions, or the usage restrictions are imposed by a database indexed by the device identification. After authentication, it is not necessary to link a certain transmitter device to a particular receiver, and thus anonymous statistics may be maintained for auditing, etc.

One way to provide self-authentication without need for remote management is a challenge-response algorithm. For example, the device may include a photodiode receiver (or indeed, may employ the same light emitting diode as used for transmission as a photodiode element, see www.sensorsynergy.com/helpfulhints.htm) which reads optical data transmitted from a television screen. This "challenge" signal is then processed in the device according to a secret algorithm, to produce a "response" signal to the receiver. The receiver then compares the received "response" to the anticipated "response" based on the challenge, and thus authenticates the secret algorithm. This algorithm, in turn, may be stored in tamper-resistant, volatile memory, and thus the "secret" protected. Further, the algorithm may be periodically updated in both the receivers and devices, limiting the harm if the secret becomes breached. See Challenge Response security references cited above, each of which is expressly incorporated herein by reference.

The single use only character of a preferred embodiment of the signal generator according to the present invention that makes it a particularly attractive commercial product in many aspects.

Another embodiment of the invention provides a relatively full-function remote control with a durable power source, which is not constrained in its use by power supply. Thus, the device may provide sufficient power for normal operation over 1, 4, 7, or 14 days, or longer. In this case, restrictions are imposed logically, rather than physically. For example, a timer or clock may be provided within the device to determine when it is first activated, and provide a set of functionality dependent on that time. The device is normally activated by removing a battery insulator, though it can be activated by an electronic signal or the like. For example, it may be desired to limit the use of the device for a period after distribution. Thus, the device may be activated upon distribution, for example by separation from a carrier, and then operate for 1, 4 or 7 days thereafter. Alternately, the device may be activated upon or in conjunction with its first use.

The invention may also be implemented using a smart card or other information carrier which is supplied to a persistent device, such as a remote control or a set top box. For example, a remote control device is provided with a card reader, which may be a smart card (i.e., a thin carrier device with an electrical connector or electromagnetic communication interface between a secure processor embedded within the carrier), optically or magnetically encoded pattern, or otherwise having a readable code which is reasonably authenticatable and counterfeit resistant, which is read by the device. The information on the carrier activates all or a portion of the functions available through the remote control or set top box, thus alleviating the need for remote access control and permitting broadcast of the program material to the receiver without implementing selective access technologies for all channels, and thus not requiring external communication of the identification of the program material in some cases. The carrier may be sized similarly to a credit card, though other form factors may be usable, such as SD or mini-SD memory cards, SIM cards, CF, XD, or other known form factors. The remote control may be similar in form factor to existing remote controls, e.g., sized to be held and activated with a single child or adult human hand.

The function of the card is, for example, to securely activate a timer, which may be implemented in a smart card in the carrier or within the remote (or in the set top box) to watch premium programming such as pay-tv, for a limited time, and thereafter restrict viewing or tuning or program selection.

The system therefore supports a business model in which the information carrier authorizes a predetermined time of viewing, without providing any persistent association of an identification of the viewer and the content being viewed, and thereby ensuring privacy.

According to one embodiment, an accounting system may be supported which automatically activates and accounts for the card when first used. This, for example, requires sending a signal from the carrier, through the remote control, to the receiver, and hence to a remote server. This scheme, while adding a level of complexity to the infrastructure, permits compensation for the carrier based on actual usage, and compensation of the content owners of pay-per-view programming based on actual viewing. This extended infrastructure, which is not generally required by other embodiments of the invention, may be used to ensure that the carriers are authentic and properly paid for, since duplicate usage or spurious authentication requests could be readily identified. For example, a vendor of a carrier may be charged for the inventory only as the carrier is used, and therefore wide distribution of the carriers to many vendors is encouraged. Such accounting may be accomplished by communicating to a central server the identification of a carrier when it is first employed, or each time it is employed, to then bill the account of the seller. Assuming that the carrier itself is acquired anonymously, and the set top box does not reveal the information presented, privacy is preserved. However, an encrypted or secure identification or identification protocol may be provided as necessary to ensure system security, protected from availability under normal circumstances.

In other embodiments, the carrier which operates in conjunction with a durable remote control, or a disposable remote control device, directly activate and control the media device, e.g., television, and do not necessarily interact with other remote systems, thus permitting compensation for the activation of the programming services without diminishing privacy by explicitly identifying the programming services on a hotel bill or by linking a room number with the programming presented. Circumvention resistance is typically obtained by using a non-ubiquitous communication protocol between the remote control and the media device, and therefore preventing use of unauthorized third party remote controls that circumvent limitations. Counterfeiting resistance may be obtained cryptographically or by employing proprietary electronics. Thus, in such embodiments, for example, the remote control is activated by the information carrier (e.g., activation card), by pulling a tab at the back if it is a key-seize remote, etc., and simply pointed at the infrared receiver window of the television, which responds to the remote if within its authorization parameters, e.g., time window of operability.

An embodiment therefore provides a remote control device, comprising a housing having at least one user interface control inputs, a self-contained power source, a transmitter adapted to transmit a remote control signal corresponding to an activation of the at least one user interface control input, and a detachable authorization information carrier, wherein a non-consumed detachable authorization information carrier provides authorization for a limited quantity of usage, which is consumed by such use, and wherein a consumed detachable authorization information carrier does not provide authorization for usage. The detachable authorization information carrier may comprises a smart card. The detachable authorization information carrier may be consumed, for example, by an alteration of electronically stored information therein. The detachable authorization information carrier may comprise a cryptographic information processor and an electronic memory. The quantity of use may comprise a predetermined duration and/or a predetermined number of uses. The transmitter may comprise at least one modulated infrared optical signal generator. The detachable authorization information carrier may be authenticated by a process comprising receiving a challenge signal from a processor in the housing, processing the challenge signal in the detachable authorization information carrier according to a secret algorithm to produce a response signal, transmitting the response signal to the processor to be controlled with an usage limitation, authenticating the response signal and usage limitation in the processor, and selectively activating the transmitter in accordance with the usage limitation, wherein the usage limitations represents a prepaid compensation for controlled access to a device to be controlled by the transmitter.

The device may be multifunctional, and for example, serve as a complete or supplemental remote control for a device, such as a video tuner. For example, the device may include buttons for volume control (+/−), channel (up/down), on/off, mute, etc. The device, for example, may be programmed to provide a set of activations for premium programming, i.e., pay per view. Thus, the device may have a button for activating a pay per view channel. The device may be preprogrammed to provide a limited number or duration of such activations. Thus, billing for such programs need not appear on a hotel bill, for example, since the accounting is separate and prepaid.

The present invention therefore provides a relatively anonymous method for prepaid authorization of functioning of an electronic system, which avoids the need for an express accounting log of usage to verify charges. Thus, user privacy is enhanced.

BRIEF DESCRIPTION OF THE DRAWINGS

The invention will now be further elucidated on the basis of the example given in the drawings, where.

DETAILED DESCRIPTION OF THE PREFERRED EMBODIMENTS

Figure 1:
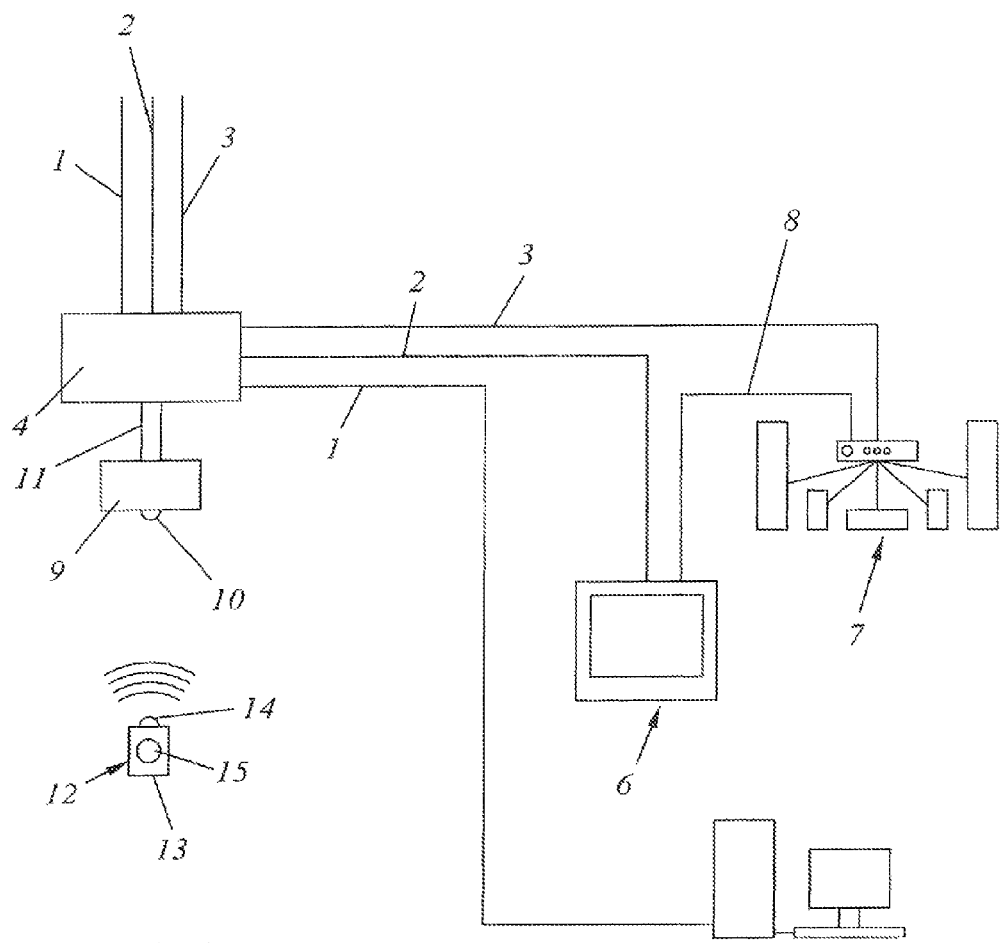
FIG. 1 shows a schematic diagram of a device having a signal generator and signal receiver according to the present invention.

FIG. 1 shows a schematic diagram of an embodiment in which an interruption and/or distortion unit 4 is included in a number of incoming channels 1, 2 and 3. It is not unusual, especially with television channels, to distort only the channels that are not allowed to be seen, while leaving the other channels viewable. Other channels, e.g. data channels such as Internet connections, can easily be selected for connection.

In the example given, channels 1, 2 and 3 are a data channel 1 with a computer 5 connected to it or to be connected to it, a television channel 2 with television receiver 6 and a separate audio channel 3 with audio installation 7. Audio installation 7 can be connected to television set 6 by connection 0, so that it is also possible to play DVDs.

With interruption and/or distortion unit 4, connections 11 connect a receiving device 9 to a signal receiver 10. Receiving device 9 and signal receiver 10 are set to receive and detect a previously-determined simultaneously plurality of transmitted infra-red signals and/or radio signals. These previously-determined optical (typically infra-red) signals and/or radio signals are transmitted by signal generator 12. The signal generator 12 may therefore be a set of infrared light emitting diodes (which may differ in location or orientation, optical wavelength, polarization, etc.), and/or radio frequency transmitters (e.g., ITU unregulated frequencies, including, for example, 6765-6795 kHz, 433.05-434.79 MHz 61-61.5 GHz, 13,553-13,567 kHz, 26,957-27,283 kHz, 40.66-40.70 MHz 902-928 MHz, 2,400-2,500 MHz, 5,725-5,875 MHz and 24-24.25 GHz). While typically, a single modality of communication is used, it is possible to have both infrared transmitters and RF transmitters active.

In the example given, signal generator 12 comprises a housing 13, a plurality of LEDs 14 that transmit a plurality of optical signals, and a push-button switch that can be used to transmit the signal. It is noted that the LEDs 14 may be housed in a single optical package, similar or identical to tricolour (R/G) or full color R/G/B LED modules.

Figure 2:
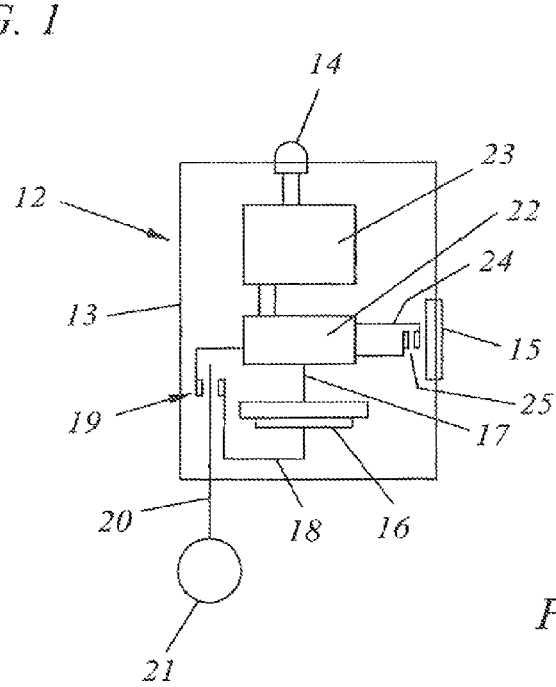
FIG. 2 shows the signal generator according to FIG. 1 schematically in more detail.

FIG. 2 shows signal generator 12 schematically in more detail. In housing 13, there is a battery 16 in the form of a button cell, which supplies the whole circuit. Connections 17 and 18 connect battery 16 to a programmable integrated circuit 22. Connection 18 includes a spring-loaded set of contact points 19, interrupted by a non-conducting strip 20. Strip 20 is provided with a grip 21, to which the strip can be extended between contact points 19. Integrated circuit 22 is further connected to LEDs 14 by switch part 23, whereby switch part 23 also has the components required to drive LEDs 14. It is, however, also possible to integrate circuit 22 so far that it can drive the LEDs directly. Finally, connection 24 with contact points 25 connects push contact 15 to integrated circuit 22.

Signal generator 12 can be made extremely small, whereby however a minimum size will preferably be adhered to so that signal generator 12 and particularly push contact 15 can still be easily operated. One possible size for the top surface of the housing is in the order of 2×3 cm, for instance.

Switching the whole system starts with reversing the interruption in the power supply to signal generator 12 by removing the non-conducting strip 20. Next, push contact 15 is operated, so that integrated circuit 22 is triggered and LEDs 14 transmit the simultaneous previously-determined signals. With infra-red signals, or spatially diverse signals, it is important that LEDs 14 are properly aimed in the direction of the signal receiver 10, with sufficient time having been set, e.g. 30 seconds. After signal receiver 10 detects the simultaneous signals, interruption and/or distortion unit 4 is activated to connect and/or pass the incoming channels undistorted. Here, unit 14 is programmed for how long the channels are to be made available, e.g. 12 or 24 hours.

The foregoing disclosure of embodiments and exemplary applications of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A signal generator device for providing controlled access to user-selected information and/or communication channels, comprising distinct restricted and unrestricted information and/or communication channels, through a signal receiver,
the signal generator comprising a once-only use element defining a predetermined duration after initial activation, and a wireless transmitter adapted for wirelessly transmitting at least one authentic authorization signal, to selectively control the signal receiver to:
selectively provide restricted access to restricted information and/or communication channels on receiving the authentic authorization signal only during a period prior to an automatically determined expiration of the predetermined expiration period, and
unrestricted access to unrestricted information and/or communication channels at least after the automatically determined expiration of the predetermined duration,
wherein the signal generator transmits information for controlling the signal receiver selectively in dependence on at least a time of first activation and the predetermined duration.

2. A device according to claim 1, characterized in that the signal generator is adapted to transmit information to the signal receiver for processing at the signal receiver after expiration of the predetermined duration after initial activation, which provides control over unrestricted information and/or communication channels.

3. A device according to claim 2, characterized in that the signal generator is provided with a programmable integrated circuit, which controls concurrent transmission of two or more signals and which stores in a memory the predetermined duration during which a set of authentication information which characterizes the authentic authorization signal can be transmitted.

4. A device according to claim 3, characterized in that a program included in the programmable integrated circuit is triggered by the initiation of contact of a switch within the signal generator.

5. A device according to claim 4, characterized in that the integrated circuit is so programmed that the transmission of the authentic authorization signal is prevented after the prescribed duration has expired.

6. A device according to claim 4, characterized in that the integrated circuit is so programmed that a modulation of the at least one of said two or more signals is changed after the expiration of the predetermined duration expiration period.

7. A device according to claim 2, characterized in that a once-only contact switch is provided for connecting an integrated circuit in the signal generator controlling the wireless transmitter to an electrical power source.

8. A device according to claim 1, further comprising a housing that accommodates a programmable integrated circuit, a power source, a transmitter to transmit the at least one authentic authorization signal, a switch to activate a program saved in the integrated circuit, and least one manually operable information and/or communication channel source selection button.

9. A device according to claim 8, wherein the integrated circuit comprises a removable smart card and the housing comprises a socket adapted to receive the smart card and provide electrical connections therewith.

10. A device according to claim 1, in combination with the signal receiver, characterized in that the signal receiver is set to authenticate the at least one authentic authorization signal transmitted by the signal generator and, on authentication, to selectively provide access to restricted information and/or communication channels, wherein the signal receiver relies solely on the authentication information from the signal generator to implement the predetermined duration restriction on access to the restricted information and/or communication channels.

11. A device comprising a signal generator for communicating wirelessly with any of a set of signal receivers, for providing user selection of, and access authorization to, restricted information and/or communication channels, the access authorization to the restricted information and/or communication channels being controlled by a once-only use element expiring after a predetermined duration after a time of a first activation of the signal generator, and the set of signal receivers selectively providing access to the restricted information and/or communication channels in response to an access command communicating the access authorization from a signal generator within the predetermined duration prior to expiration, wherein the predetermined duration is limited by a common expiration across the set of signal receivers preprogrammed into the signal generator, and wherein the signal generator continues to provide user selection of, and access to, unrestricted information and/or communication channels, but not restricted information and/or communication channels, at a time after the predetermined duration has expired.

12. The device according to claim 11, wherein the signal generator comprises an integrated circuit, a signal transmitter, and a power source, wherein the common expiration is controlled in dependence on a program executing in the integrated circuit.

13. The device according to claim 12, wherein the integrated circuit comprises a removable smart card and the signal generator comprises a socket adapted to receive the smart card and provide electrical connections therewith.

14. The device according to claim 12, wherein the time of the first activation is triggered by a switch.

15. The device according to claim 14, wherein the integrated circuit is so programmed that a transmission of the access authorization is blocked after the predetermined duration has expired.

16. The device according to claim 15, wherein the integrated circuit is programmed to alter a transmitted signal after the predetermined duration has expired so that access is granted only to unrestricted information and/or communication channels.

17. The device according to claim 11, wherein the user selected restricted information and/or communication channels comprise user selected pay TV channels received by the signal receiver as a broadcast from a remote source, and wherein said signal generator receives user input for selecting at least a pay TV channel and for controlling an audio volume, a respective signal receiver authenticating the signal generator locally substantially without external communication with the remote source, whereby an identification of the signal receiver which accesses a restricted information and/or communication channel is shielded from the remote source of the restricted information and/or communication channel.

18. The device according to claim 11, wherein said signal generator comprises a programmable integrated circuit, a power source, a transmitter adapted to transmit the access command, a switch to initiate a program saved in the programmable integrated circuit, and a housing having an internal space to accommodate the programmable integrated circuit, and the power source.

19. The device according to claim 11, wherein the common expiration is secured against prolongation by a cryptographic algorithm executing in an integrated circuit housed within the device.

20. The device according to claim 11, wherein the signal generator and a respective signal receiver communicate by infrared optical communications which are resistant to a replay after expiration of the predetermined duration of a single infrared wavelength, and wherein the once-only use element is replaceable and selectively defines the predetermined duration.

21. A method for providing controlled access to user-selected content, comprising:

distributing at least one of a remote control device and a smart card for a remote control device, having a programmed therein a predetermined expiration after first use limited by a physical element having a single, non-prolongable, predetermined duration of authenticated access to restricted information and/or communication channels;

activating the at least one of a remote control device and a smart card for a remote control device;

automatically determining, within the remote control device, the predetermined expiration of the at least one of a remote control device and a smart card for a remote control device based on a time of first activation;

during a period prior to the automatically determined expiration, controlling with the remote control device, access to user-selected restricted content, and blocking access to user-selected restricted content after the automatically determined expiration; and during at least a period subsequent to the automatically determined expiration, controlling with the remote control device access to user-selected unrestricted content, the restricted content and the unrestricted content being respectively different.

* * * * *